US012266235B2

(12) United States Patent
Gibson et al.

(10) Patent No.: US 12,266,235 B2
(45) Date of Patent: Apr. 1, 2025

(54) OVERHEAD DISPLAY MOUNTING SYSTEM, OVERHEAD DISPLAY FOR GAMING MACHINES, AND GAMING MACHINE BANK WITH OVERHEAD DISPLAY

(71) Applicant: Everi Games Inc., Austin, TX (US)

(72) Inventors: Daniel Gibson, Austin, TX (US); Travis Bussey, Austin, TX (US); Garrett Mancillas, Austin, TX (US); Steven Speer, Austin, TX (US)

(73) Assignee: Everi Games, Inc., Austin, TX (US)

( * ) Notice: Subject to any disclaimer, the term of this patent is extended or adjusted under 35 U.S.C. 154(b) by 309 days.

(21) Appl. No.: 17/979,698

(22) Filed: Nov. 2, 2022

(65) Prior Publication Data

US 2023/0134141 A1 May 4, 2023

Related U.S. Application Data

(60) Provisional application No. 63/274,969, filed on Nov. 3, 2021.

(51) Int. Cl.
*G07F 17/32* (2006.01)

(52) U.S. Cl.
CPC ...... *G07F 17/3216* (2013.01); *G07F 17/3211* (2013.01)

(58) Field of Classification Search
CPC .......................... G07F 17/3216; G07F 17/3211
See application file for complete search history.

(56) References Cited

U.S. PATENT DOCUMENTS

| | | | | | |
|---|---|---|---|---|---|
| D1,006,119 | S * | 11/2023 | Seckel | D21/369 | |
| 2006/0238967 | A1* | 10/2006 | Carson | B60R 11/0235 | 361/679.04 |
| 2014/0342825 | A1* | 11/2014 | Schrementi | G07F 17/3216 | 463/31 |
| 2019/0102971 | A1* | 4/2019 | Schoonmaker | G07F 17/3211 | |
| 2019/0320543 | A1* | 10/2019 | Wand | G07F 17/3211 | |
| 2021/0005051 | A1* | 1/2021 | Shaffer, Jr. | G07F 17/3216 | |
| 2021/0110638 | A1 | 4/2021 | Chambers | | |

FOREIGN PATENT DOCUMENTS

| | | | | |
|---|---|---|---|---|
| CN | 202121175988 | * | 5/2021 | G09F 9/302 |

* cited by examiner

*Primary Examiner* — James S. McClellan
(74) *Attorney, Agent, or Firm* — Calvert Technology Law, PLLC; Nathan H. Calvert

(57) ABSTRACT

A display mounting system includes first and second base supports, a lateral support system, and display module hanger brackets. The lateral support system includes a first lateral support element and second lateral support element and is adapted to be placed in a display module receiving configuration in which the lateral support system is connected to the first and second base supports in a supporting configuration. Each display module hanger bracket has a respective hanger structure and a respective stabilizing structure. When one of the display module hanger brackets is placed in an installed position on the lateral support system, the hanger structure of that respective display module hanger bracket is supported along a height axis by the first lateral support element while the stabilizing structure of the display module hanger bracket cooperates with the second lateral support element to position the stabilizing structure relative to the second lateral support element.

10 Claims, 20 Drawing Sheets

OVERHEAD DISPLAY MOUNTING SYSTEM, OVERHEAD DISPLAY FOR GAMING MACHINES, AND GAMING MACHINE BANK WITH OVERHEAD DISPLAY

CROSS-REFERENCE TO RELATED APPLICATION

Applicant claims the benefit, under 35 U.S.C. § 119(e), of U.S. Provisional Patent Application No. 63/274,969 filed Nov. 3, 2021, and entitled "Overhead Display Mounting System, Overhead Display for Gaming Machines, and Gaming Machine Bank with Overhead Display." The entire content of this provisional application is incorporated herein by this reference.

TECHNICAL FIELD OF THE INVENTION

The invention relates to overhead displays used with a bank of gaming machines. More particularly, the invention provides a simplified display mounting arrangement for producing an overhead display. The invention encompasses overhead display mounting systems, overhead displays for a bank of gaming machines, and gaming machine banks fitted with an overhead display.

BACKGROUND OF THE INVENTION

Modern gaming systems may include individual gaming machines arranged in banks of various shapes. A bank of gaming machines may include multiple gaming machines arranged in a straight line or in some geometrical or circular arrangement. Overhead displays may be included with a bank of gaming machines to display information or graphics associated with play of the various games offered at the bank of gaming machines and/or graphics intended to draw attention to the bank of gaming machines and encourage play at the gaming machines included in the bank. Prior overhead display systems for gaming machine banks included bulky and/or heavy components and commonly required special lift equipment and a team of personnel for installation.

SUMMARY OF THE INVENTION

It is an object of the invention to provide display mounting systems that overcome the above-noted problems and others associated with providing an overhead display for a set of gaming machines. Other objects of the invention are to provide display systems for a set of gaming machines and to provide gaming machine bank and overhead display systems.

According to a first aspect of the invention, a display mounting system is configured to position a number of display modules above a set of gaming machines. A display mounting system according to this first aspect of the invention includes first and second base supports, a lateral support system, and display module hanger brackets. The first and second base supports and are adapted to be placed in a laterally spaced apart supporting configuration. The lateral support system includes a first lateral support element and second lateral support element, and is adapted to be placed in a display module receiving configuration in which the lateral support system is connected to the first and second base supports in the supporting configuration. When in the lateral support system is in the display module receiving configuration the first and second lateral support elements together provide a number of display receiving locations along a length of the lateral support system. Each display module hanger bracket has a respective hanger structure and a respective stabilizing structure spaced apart from the hanger structure. With this arrangement, when one of the display module hanger brackets is placed in an installed position on the lateral support system the hanger structure of that respective display module hanger bracket is supported along a height axis (a vertical axis) by the first lateral support element while the stabilizing structure of the display module hanger bracket cooperates with the second lateral support element to position the stabilizing structure relative to the second lateral support element.

In some implementations according to the first aspect of the invention, the first and second base supports may each be free-standing structures that are separate from any of the gaming machines. In these arrangements the base supports may be placed separately from any of the gaming machines and may require no support from, or connection to, any of the gaming machines. In other implementations the first and second base supports each include a respective candle base connector structure configured to connect to a candle base of a respective gaming machine to place the respective base support in the desired supporting configuration. The example candle base connector structure comprises simply an end of the base support that is sized and shaped to slide over the candle base with close tolerance and then fastened in place over the candle base with suitable fasteners. Regardless of the structure used for the candle base connector structure, in these implementations, the base supports are ultimately held in the laterally spaced apart supporting configuration by the structure of the connected gaming machine.

Regardless of whether the base supports connect to the candle base of a gaming machine or are free standing, each base support may include a base support bracket configured to receive the lateral support elements. The first base support may include a first base support bracket having first and second base bracket parts. The first base bracket part extends transverse to a longitudinal axis of the first base support to form a ledge configured to receive a segment of the first lateral support element. The second base bracket part also extends transverse to a longitudinal axis of the first base support to form a second ledge configured to receive a segment of the second lateral support element. The second base support similarly includes a second base support bracket having first and second bracket parts similar to those associated with the first base support for receiving the first and second lateral support elements. Thus the base support brackets are configured to support the lateral support elements at vertically spaced apart locations to hold the lateral support elements at the desired height along the height axis. A suitable fastener may to used to secure first lateral support element to the base support bracket. A similar fastener arrangement may be used to connect the second lateral support element to the base support bracket.

At least one of the first lateral support element and second lateral support element may be spaced apart from an upright portion of the respective base support and base support bracket when the lateral support system is in the display module receiving configuration. With regard to the base support bracket, a cut-out or notch may be provided particularly adjacent to the second lateral support element. This arrangement may allow the display module hanger brackets to freely slide along the lateral support elements as will be described below in reference to the figures to facilitate positioning of the display modules.

At least one of the first lateral support element and the second lateral support element comprises an elongated rail. This elongated rail may be linear or follow a desired curve such as a radius of a circle. Multiple rails may be connected together end-to-end to extend the lateral support system to any desired length. Rather than follow a curve, lengths of linear lateral support elements may be connected together to form a polygon with each side of the polygon providing a mounting location for one or more display modules.

The display module hanger bracket may be formed in two separate pieces and may include a display module connector structure such as suitable fastener holes adapted to connect the display module hanger bracket to a respective display module. Suitable fasteners may extend through such fastener holes into suitably threaded holes formed on the display module. Alternatively, the display module hanger bracket may be integrally formed with a display module.

In some implementations according to the first aspect of the invention, the hanger structure of a given display module hanger bracket includes one or more retention elements that each abuts a rearwardly facing surface of the first lateral support element when the first display module hanger bracket is placed in the installed position on the lateral support system. The hanger structure of a display module hanger bracket may also include one or more spacer elements that each abuts a forwardly facing surface of the first lateral support element when the display module hanger bracket is placed in the installed position on the lateral support system.

The respective stabilizing structure of a given display module hanger bracket may include one or more retention elements that each abuts a rearwardly facing surface of the second lateral support element when the first display module hanger bracket is placed in the installed position on the lateral support system. The respective stabilizing structure of the given display module hanger bracket may also include a spacer element that abuts a forwardly facing surface of the second lateral support element when the first display module hanger bracket is placed in the installed position on the lateral support system.

A second aspect of the present invention comprises a display system for a set of gaming machines. A display system according to this aspect of the invention includes a display hanger system in accordance with the first aspect of the invention together with a respective display module connected to each respective display module hanger bracket and located opposite to the rear side of the respective display module hanger bracket. The display module may comprise a single module segment in some implementations. Alternatively, the display module may be made up of two or more display module segments connected to the respective display module hanger bracket. Also, regardless of whether the display module includes a single display component or is made up of multiple display module segments, the resulting display module may present a flat (planar) display surface, a concave surface, or a convex surface. Where multiple display module segments are used the individual segment will have a planar display surface to produce an overall planar display module, will have a concave surface to produce an overall concave display module, and will have a convex surface to produce an overall convex display module.

A gaming machine bank and display system according to a third aspect of the invention includes a number of two or more gaming machines located side-by-side in a respective operating position with respect to each other. In the operating position each respective gaming machine has a gaming machine installed width Y-EGM centered on centerline C. Beyond the bank of gaming machines, this third aspect of the invention includes first and second base supports, a lateral support system, and display module hanger brackets similar to the corresponding elements of the display mounting system described above in connection with the first aspect of the invention. A gaming machine bank and display system according to this third aspect of the invention further includes a respective display module connected to each respective display module hanger bracket and located opposite to the rear of the respective display module hanger bracket. Each respective display module has a display module installed width Y-DM substantially equal to the gaming machine installed width Y-EGM of the respective gaming machine and is aligned vertically with the respective gaming machine. In this arrangement the gaming machine bank may include any number of gaming machines without modifying the display system aside from providing sufficient lateral support length. As noted above, the lateral support elements may be connected together end-to-end by suitable means to provide any desired length. Additional base supports may be added as necessary to accommodate the desired lateral support system length and number of display modules.

In some implementations according to the third aspect of the invention, the gaming machine installed width Y-EGM may be slightly wider than the actual width of the gaming machine. In some cases, this gaming machine installed width Y-EGM represents the width of the gaming machine in a practical application considering manufacturing tolerances and installation location variables. Considering such manufacturing tolerances and installation variables, the gaming machine installed width Y-EGM and display module installed width Y-DM are such that when the gaming machines are positioned side-by-side with a suitable clearance, the adjacent display modules substantially abut each other to form a substantially continuous display area including the area of each respective display module in the installation. In some cases the gaming machine installed width Y-EGM may be substantially the actual width of the gaming machine such that the adjacent gaming machines substantially abut each other while the adjacent display modules also abut each other.

The various components of a display mounting system according to the first aspect of the present invention may be formed from any suitable material or combination of materials. The first and second lateral support elements may advantageously comprise extruded aluminum rails in a suitable profile and sized appropriately for the intended load from the display modules.

A bank of gaming machines and overhead display system according to the third aspect of the invention may be installed by first positioning the gaming machines in the desired position. The base support elements may then be installed such as by connection to the candle base or otherwise. Base support brackets may then be installed on the base support elements unless previously installed or integrally formed with the base support elements. The lateral support elements may then be installed on the base support elements via base support brackets. It may be desirable to provide a small amount of vertical adjustability for either the base support elements, or the base support brackets or portions thereof to ensure that the lateral support elements may be installed in the desired orientation which will typically be horizontally. Once the lateral support elements are installed, individual display modules, each connected to or having a display hanger bracket may be placed on the two lateral supports and then slid laterally as necessary to the desired position. Each display module may be similarly added to the lateral supports and connected to suitable power and data connectors until the desired overhead display arrangement is produced. The invention is not limited to any particular type of display module. LED or any other display technology may be employed, and the modules may be configured to generate the desired graphic displays with any suitable display-driving data input.

A fourth aspect of the invention comprises an arrangement in which a gaming machine has an installed width Y-EGM as described above. However, rather than the display mounting system as described above according to the first aspect of the invention, a display module having the module installed width Y-DM equal to Y-EGM may be supported directly by the gaming machine cabinet, particularly with an extension support that is adapted to connect to the candle base of the gaming machine. The display module is supported in this arrangement above the gaming machine but without the lateral support system described above. The arrangement of gaming machine and individually supported display module allows the gaming machines to be placed together in a straight-line bank with the display modules of the different gaming machines combining to produce an essentially continuous display area along the entire bank.

The display module employed in the fourth aspect of the invention may comprise a single module or may be made up of two or more display module segments connected together to provide the overall display area. The display module employed in this fourth aspect of the invention may include any of the variations described above, and thus may provide a flat, concave, or convex display surface.

Other aspects, advantages, and features of the invention will be apparent from the following description of representative embodiments, considered along with the accompanying drawings.

DESCRIPTION OF REPRESENTATIVE EMBODIMENTS

Figure 1:
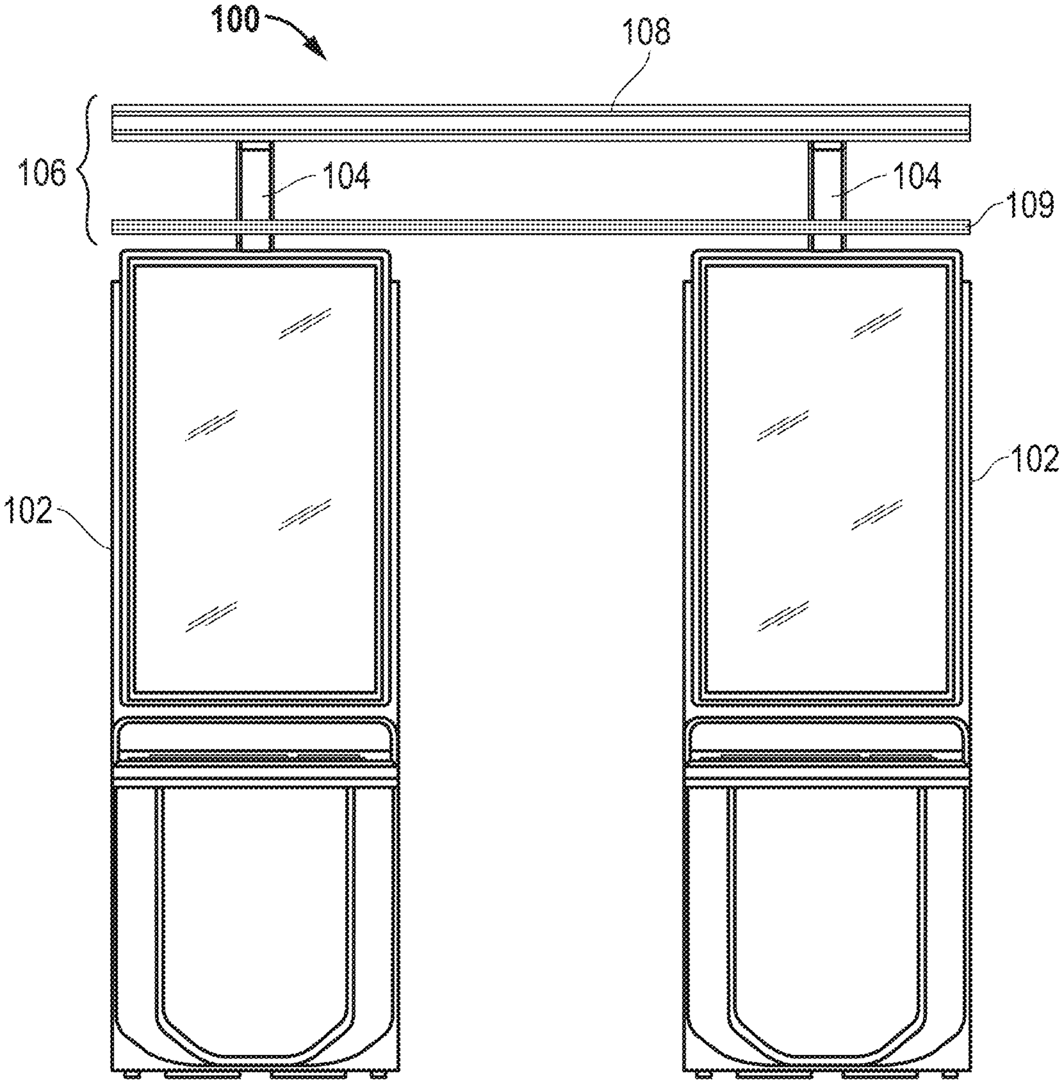
FIG. 1 is a front view showing two gaming machines and portions of a display mounting system according to one aspect of the invention.
Figure 2:
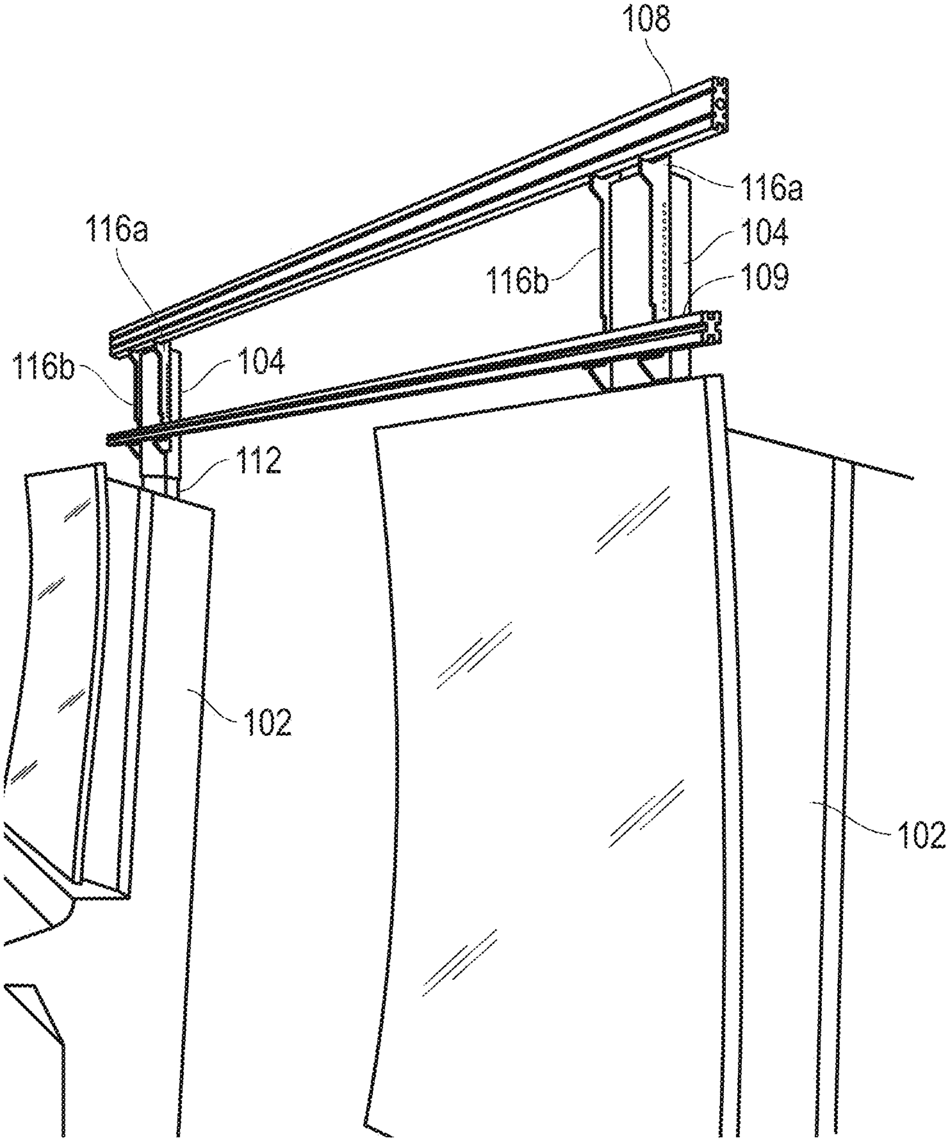
FIG. 2 is a perspective view showing a portion of the gaming machines and portions of the display mounting system of FIG. 1.

FIGS. 1 and 2 show a portion of an overhead display mounting system 100 mounted on two gaming machines 102. The two gaming machines 102 here are spaced apart sufficiently to accept a third gaming machine with only minimal clearance to produce a straight bank of three gaming machines. The portion of system 100 shown in FIGS. 1 and 2 includes two base supports 104, one each mounted on one of the gaming machines 102. The illustrated portion of system 100 also includes a lateral support system shown generally at 106 in this case made up of a first lateral support element 108 and a second lateral support element 109. These first and second lateral support elements 108 and 109, respectively, may each comprise an extruded aluminum structural element with a suitable profile and are supported on the two base supports 104 via a base support bracket 116 which is also shown best in FIGS. 2 and 3.

Figure 3:
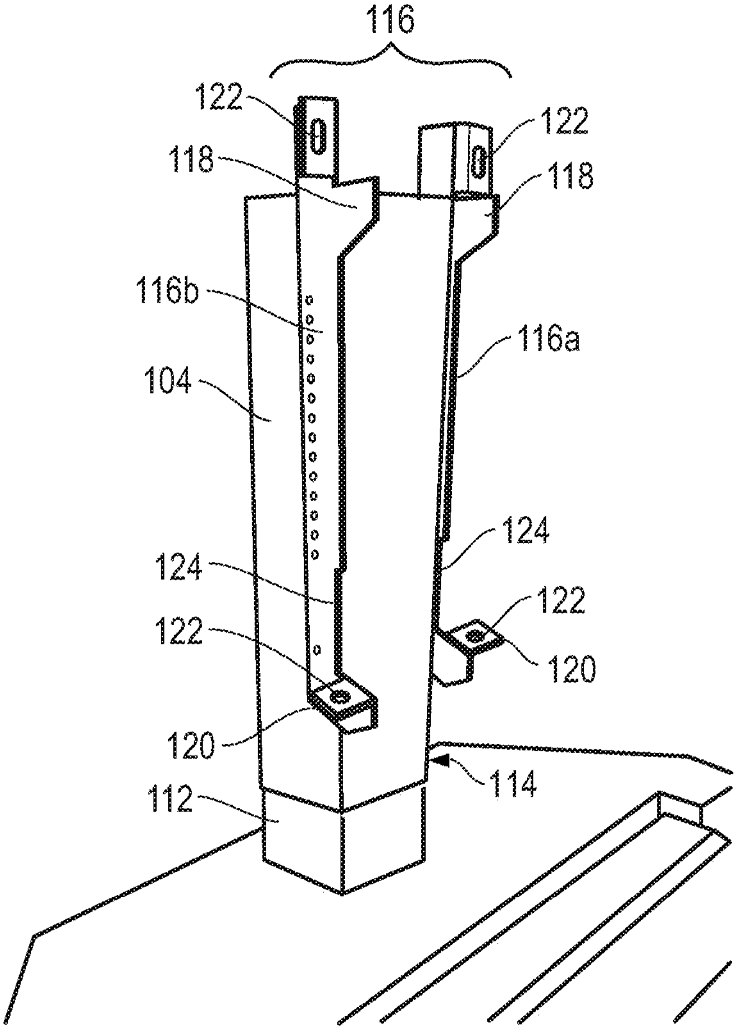
FIG. 3 is a perspective view of one of the base supports and base support brackets shown in FIGS. 1 and 2.

The example base support 104 shown in FIGS. 1 through 3 is mounted on a candle base 112 of the gaming machine shown particularly in FIG. 3. Candle base 112 is included on the gaming machines 102 to provide a mounting location for a gaming machine candle as is known in the art. However, candle base 112 provides a convenient location on some gaming machines such as gaming machines 102 for connecting a base support of an overhead display mounting system according to aspects of the present invention. Specifically, the illustrated base supports 104 include a candle connection end 114 that is sized in this example to slide over the candle base 112 and may be fastened in place by suitable fasteners or set screws not shown in the drawings. It should be appreciated that although the candle base-mounted base supports 104 shown in the example embodiment of FIGS. 1 through 3 provides a convenient and efficient base support for the overhead display system 100, other embodiments may include base supports that mount differently on the gaming machines or may be freestanding without relying on vertical support from the gaming machines.

The enlarged view of FIG. 3 shows that the example base support bracket 116 includes two separate components 116*a* and 116*b* mounted on either side of a respective one of the support base supports 104. The illustrated base support bracket components 116*a* and 116*b* each include a first support part 118 and a second support part 120, each defining a ledge that protrudes from base support 104 to receive a portion of one of the lateral support elements 108 and 109. In particular, each first support part 118 is configured to support first lateral support element 108 while each second support part 120 is configured to support second lateral support element 109. Base support bracket 116 also includes features, in this case comprising openings 122, that facilitate clamping or otherwise securing the lateral support elements 108 and 109 in the position shown in FIGS. 1 and 2. The two base support bracket components 116*a* and 116*b* also each include a notch 124 adjacent to lower support part 120. These notches 124 allow lateral position adjustment of the video display modules supported by system 100 as will be described further below.

It will be appreciated that numerous variations are possible for base support bracket 116 within the scope of the present invention. For example, the base support bracket 116 may be formed in a single part rather than the two components 116*a* and 116*b* shown in the example. A one-piece base support bracket 116 may be connected along just one side of base support 104 or may be connect along both sides of base support 104. A base support bracket within the scope of the present invention may include a structure similar to the two bracket components 116*a* and 116*b* but with the two components connected by a portion that extends across base support 104. Still other base support brackets may dispense with one or both support parts (118 and 120) and instead rely on openings such as the openings 122 and fastening or clamping elements through those openings to hold the lateral support elements 108 and 109 in the desired position along a vertical axis. More generally, any arrangement integrated with base support 104 or connected to base support 104 that can hold the lateral support elements 108 and 109 in the desired position along a vertical axis may be used in embodiments of the present invention.

Figure 4:
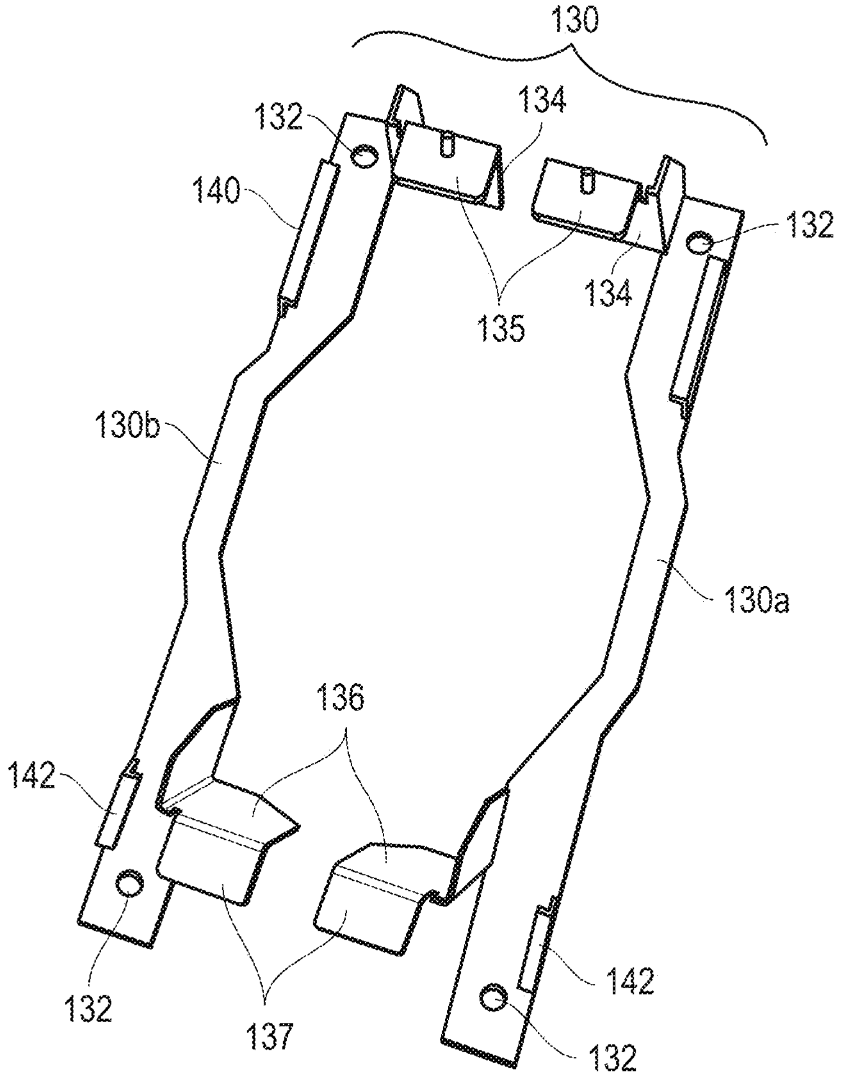
FIG. 4 is a perspective view of a display module hanger bracket according to an embodiment of the invention.
Figure 5:
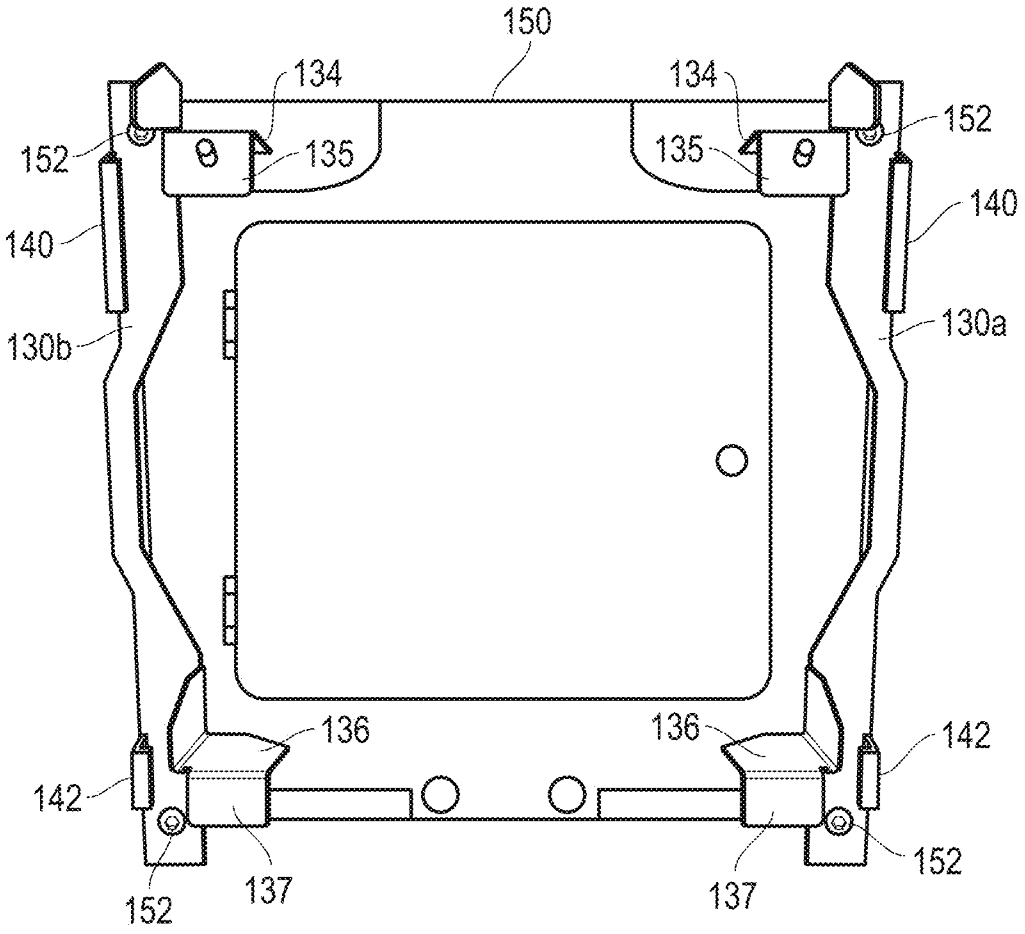
FIG. 5 is a rear view of the display module hanger bracket shown in FIG. 4 as secured to a display module.
Figure 6:
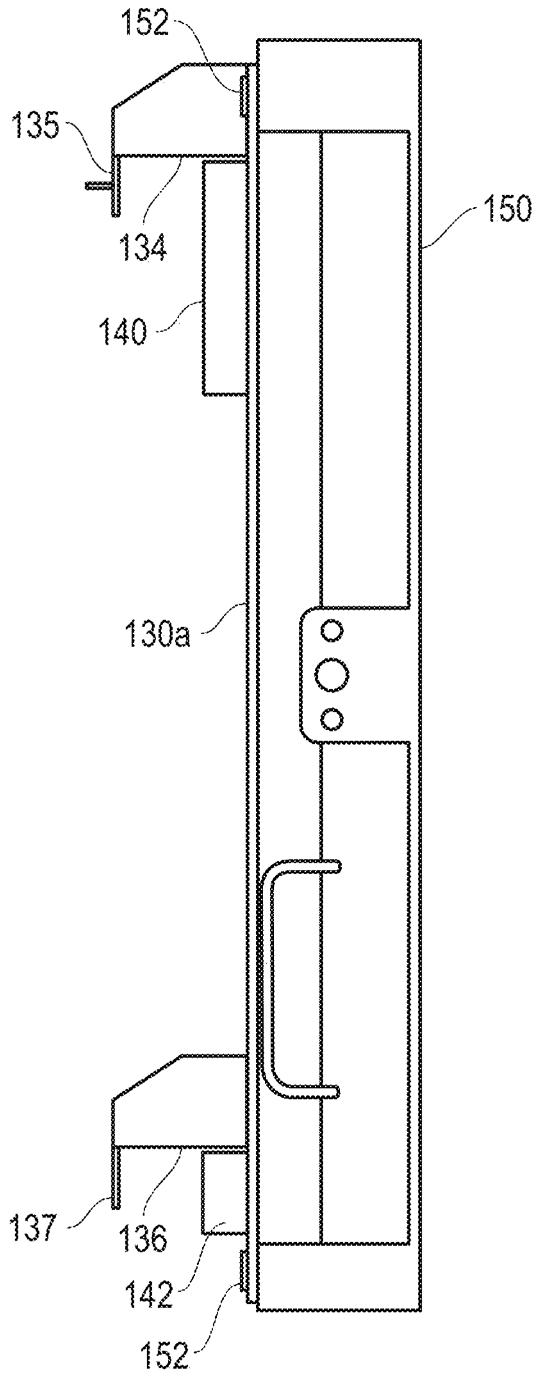
FIG. 6 is a side view of the display module hanger bracket and display module shown in FIG. 5.

FIGS. 4 through 6 may be used to describe an example display module hanger bracket 130 forming part of overhead display a mounting system 100. Example display module hanger bracket 130 is adapted to be connected to a video display module to allow the video display module to be supported on the lateral support system 106 of the overhead display mounting system 100 in accordance with aspects of the invention. The example display module hanger bracket 130 is made up of two separate components hanger bracket component 130*a* and hanger bracket component 130*b*, each including fastener holes 132 to allow the respective hanger bracket component to be fastened to a video display module. Each hanger bracket component 130*a* and 130*b* also includes a hanger part or structure 134 and a hanger retention element 135. In the example, the hanger part 134 and hanger retention element 135 form and L shape with the hanger part 134 forming one leg of the L and hanger retention element 135 forming the other leg of the L shape. Each example hanger bracket component 130*a* and 130*b* also includes a stabilizing part or structure 136 and a stabilizing part retention element 137 that together form legs of an L shape similarly to the hanger part 134 and hanger retention element 135. Example display module hanger bracket components 130*a* and 130*b* also each include spacers associated with each hanger part 134 and each stabilizing part 136. In particular, bracket components 130*a* and 130*b* each include an upper spacer 140 and a lower spacer 142.

FIGS. 5 and 6 show the example display module hanger bracket components 130*a* and 130*b* as secured on a video display module 150. As is apparent from FIGS. 5 and 6, hanger bracket components 130*a* and 130*b* connect to a rear side of video display module 150 using suitable fasteners 152 extending through faster openings 132 and into a suitable receiving opening (not shown) included on the video display module 150. When connected in the operating position shown in FIGS. 5 and 6, each hanger part 134 and each stabilizing part 136 extends rear rearwardly from the video display module 150 with the respective retention element 135 and 137 extending downwardly. Thus each pair of hanger part 134 and hanger retention element 135 forms essentially hook adapted to hook over first lateral support element 108 shown in FIGS. 1 and 2. Each pair of stabilizing part 136 and stabilizing part retention element 137 also forms essentially hook adapted to hook over second lateral support element 109 shown in FIGS. 1 and 2.

Figure 7:
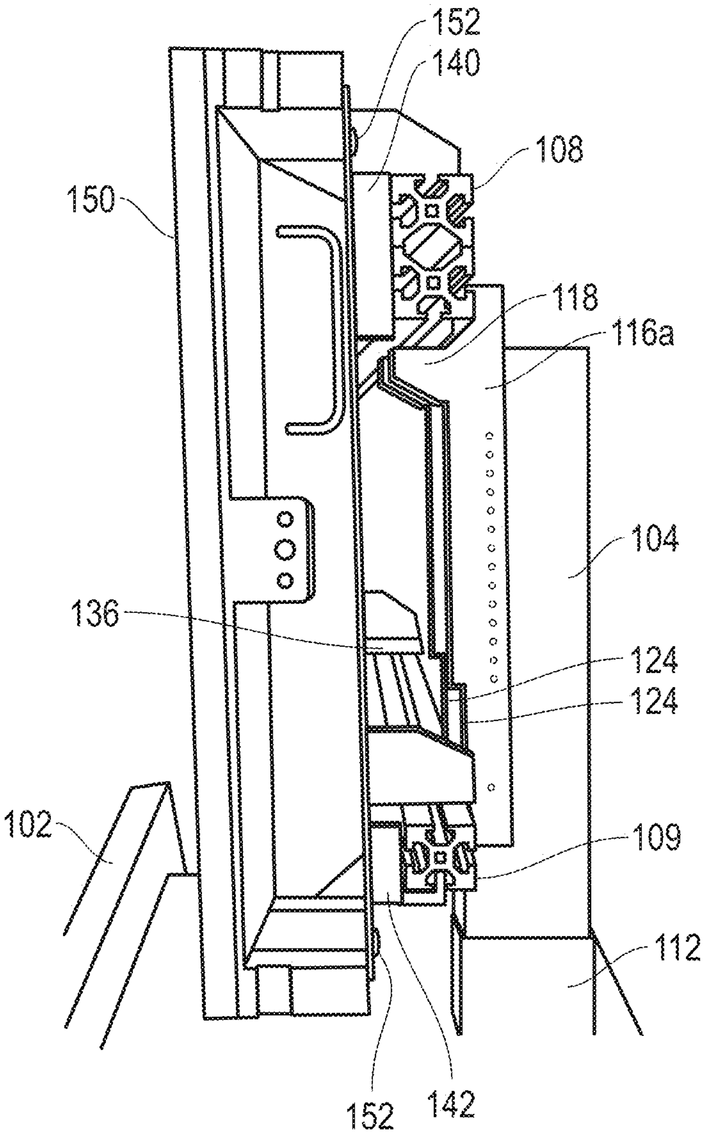
FIG. 7 is a perspective view showing the display module and display module hanger bracket shown in FIGS. 5 and 6 mounted on the lateral support elements.
Figure 8:
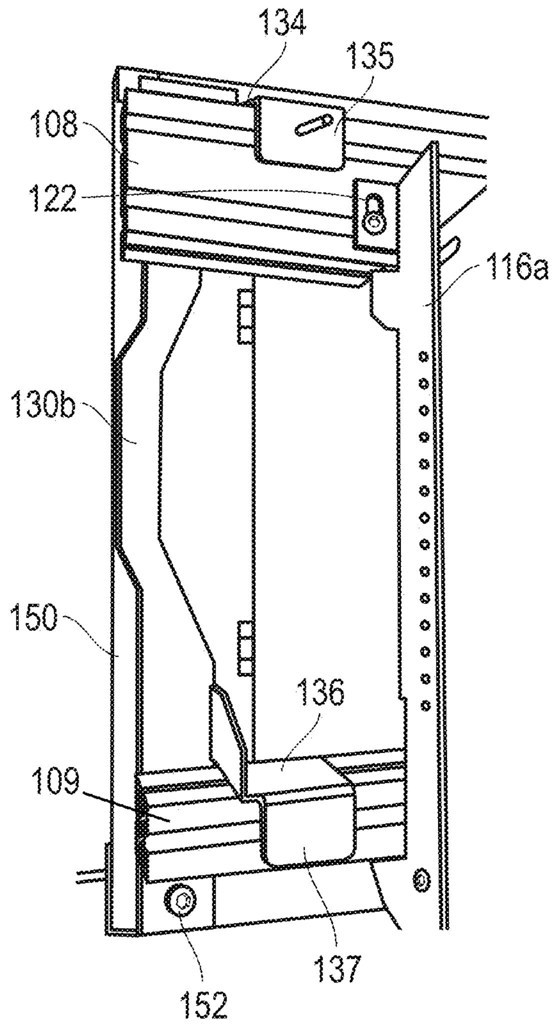
FIG. 8 is another perspective view showing the display module and display module hanger bracket shown in FIGS. 5 and 6 mounted on the lateral support elements.

FIGS. 7 and 8 show the hanger bracket components 130*a* and 130*b* and video display module 150 mounted on lateral support elements 108 and 109. It will be noted particularly in FIG. 8 that the retention elements 135 and 137 extend along the back of the respective lateral support element while the respective hanger part 134 and stabilizing part 136 rest on top of the respective lateral support element. As will be noted particularly from FIG. 7, the space between the distal end of each of the spacers 140 and retention element 135 is selected to allow lateral support element 108 to be captured therebetween with close tolerance. Similarly, the space between each spacer 142 and respective retention element 137 is selected to allow lateral support element 109 to be captured therebetween with close tolerance. This arrangement fixes the plane of the display surface of video display module 150 in the desired orientation relative to a vertical axis. In some installations hanger bracket components 130*a* and 130*b* are configured to fix the connected video display module 150 so that the display face of the device extends essentially vertically, while in other installations hanger bracket components 130*a* and 130*b* are configured to fix the connected video display module 150 so that the display face of the device is tilted forwardly at a suitable angle at the top of the video display module as desired so that the display face points downwardly toward a player residing in front of the gaming machine.

Figure 9:
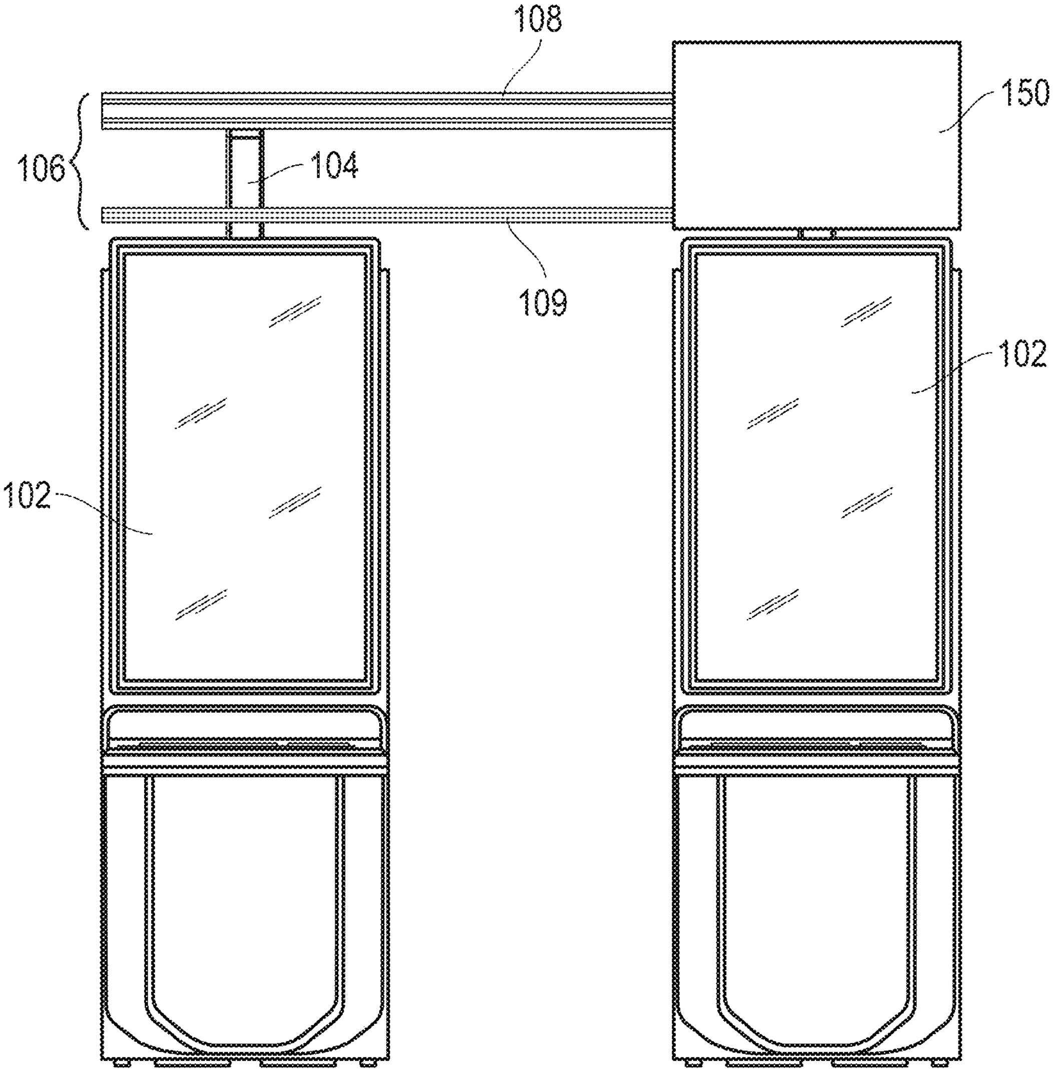
FIG. 9 is a front view similar to FIG. 1 but showing the display module and display module hanger bracket shown in FIGS. 5 and 6 mounted on the lateral support elements.
Figure 10:
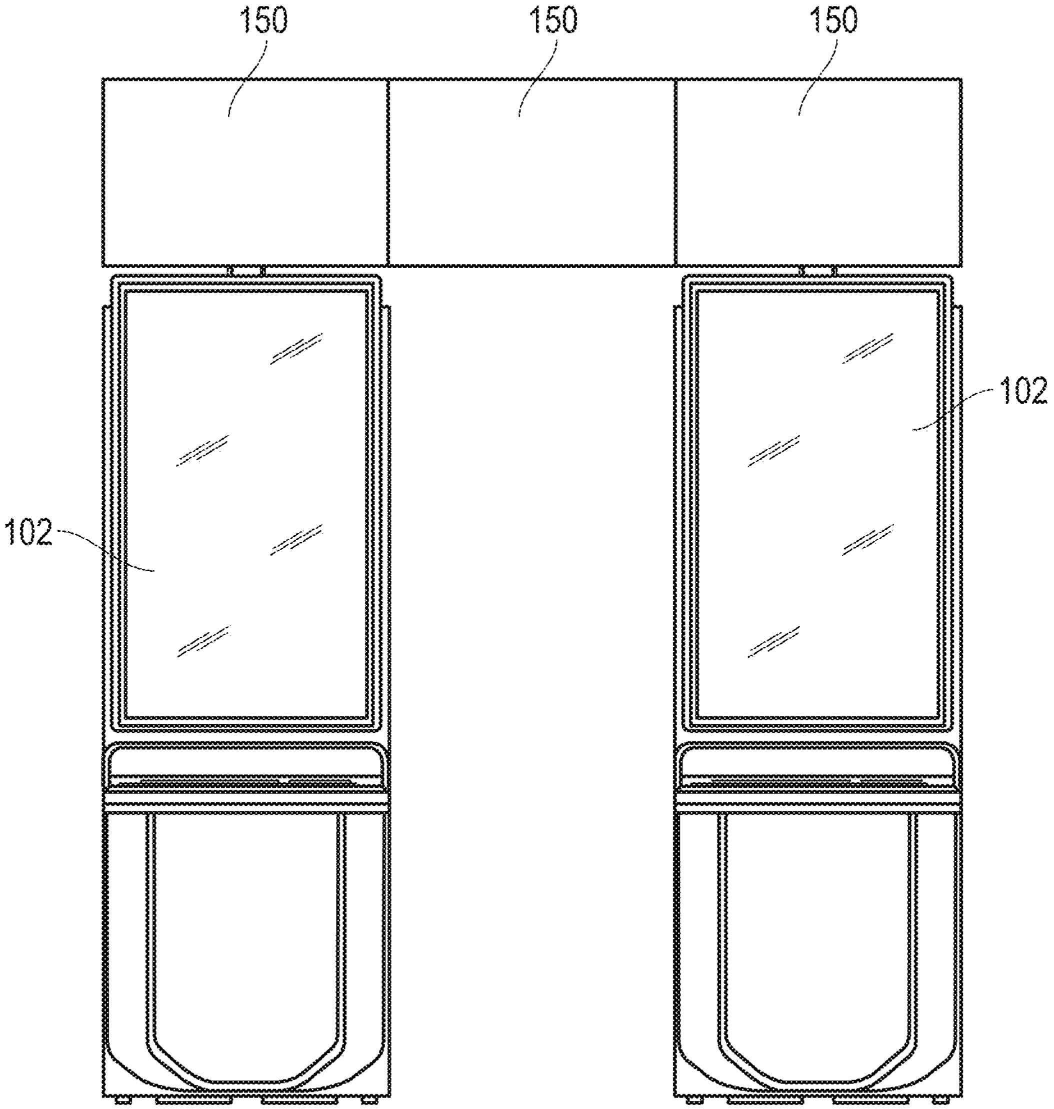
FIG. 10 is a front view similar to FIG. 7 but showing the example lateral support system supporting a maximum number of display modules for an installation of three gaming machines.

FIGS. 9 and 10 may now be used to describe how the individual video display modules may be mounted on the overhead display mounting system 100 to provide the desired overhead display. Referring to FIG. 9, a first video display module 150 with module hanger brackets 130*a* and 130*b* connected as shown in FIGS. 6 through 8 may be either lowered onto the lateral support elements 108 and 109 or slid laterally onto the lateral support elements 108 and 109 to a desired position such as an end position shown in FIG. 9. The module hanger brackets 130*a* and 130*b* and thus video display module 150 is supported along the height axis (vertical axis) by lateral support elements 108 and 109. The notches 124 shown particularly in FIGS. 3, 7 and 8 on the base support brackets 116*a* and/o 116*b* allow the stabilizing part retention element 137 to slide along lateral support element 109 in front of base support. Additional video display modules 150 may be similarly added to fill the video display module mounting space provided by lateral support elements 108 and 109. Once in the desired location along lateral support elements 108 and 109, video display module 150 may be secured in position using a suitable arrangement associated with the hanger bracket components 130*a* and/or 130*b*. For example although not shown in the figures, hanger bracket components 130*a* and/or 130*b* may include a set screw or similar arrangement that may be tightened on a respective one of the lateral support elements 108 and 109 to secure video display module 150 in the desired lateral position.

It will be noted in the example of FIGS. 9 and 10 that the individual video display modules 150 have a width dimension that essentially matches the effective width dimension of the gaming machine 102. With this correspondence between the individual video display modules 150 and gaming machines 102, overhead video display mounting system 100 allows the system to be configured for any number of gaming machines. Although the example shows positions for three gaming machines, the correspondence between the video display module width and gaming machine width allows the system to be configured for more than three or less than three gaming machines given a sufficient number of base supports 104 and base support brackets 116 (FIGS. 1 through 3) to support the number of video display modules 150 together with the lateral support elements 108 and 109. The same advantage is possible where smaller video display modules are used provided a whole number of video display modules may be placed side-by-side to form a width essentially the equal to the width of the given gaming machine. For example, the video display modules may each be one half of the width of the gaming machine or one third of the width of the gaming machine. It is also possible to use video display modules having a width or a connected width that does not coincide with the width of each gaming machine in which case the overall width of the overhead display may vary from the overall width of the installed a bank of gaming machines.

Figure 11:
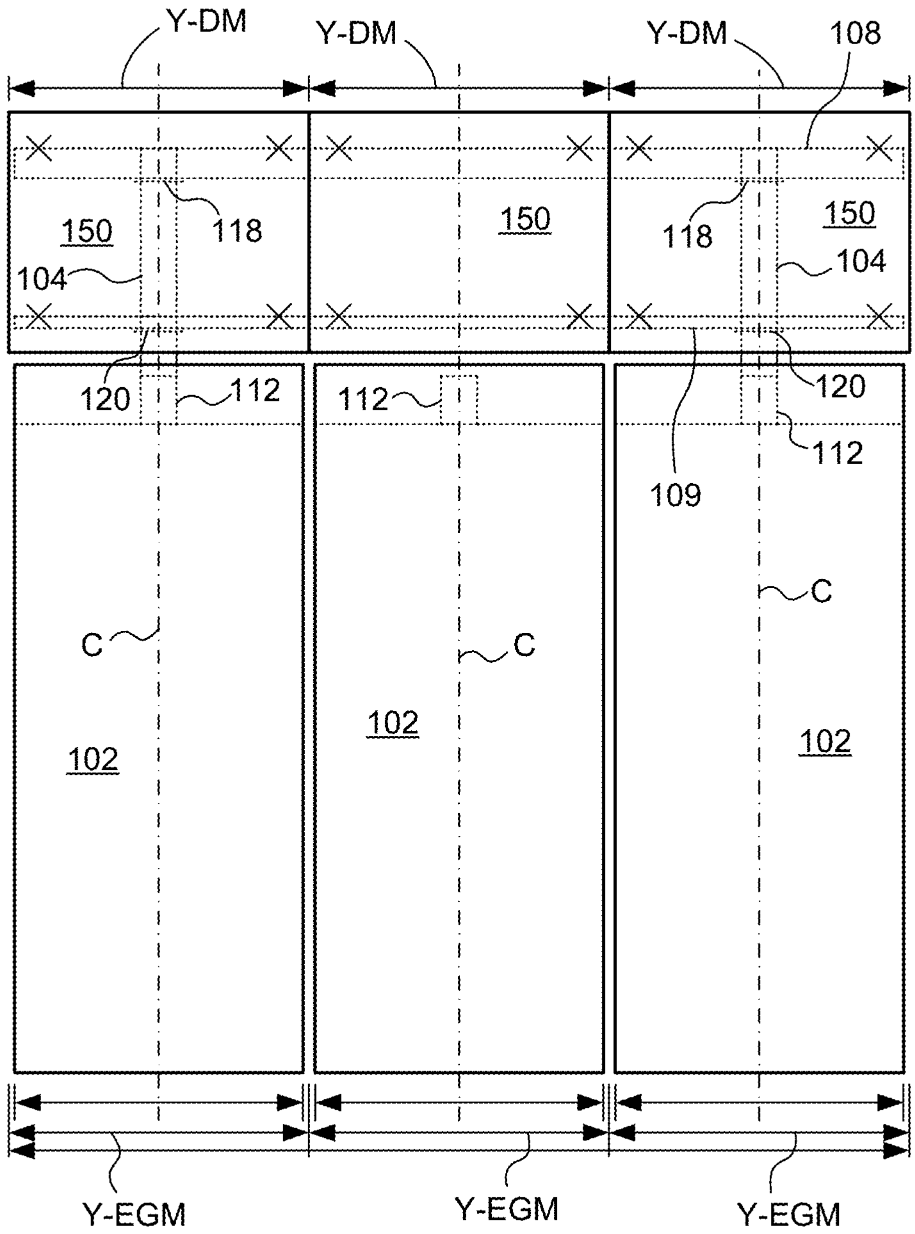
FIG. 11 is schematic drawing showing a gaming machine bank and overhead display system according to an aspect of the present invention.

The schematic representation of FIG. 11 further illustrates the relationship between the width Y-DM of the video display modules 150 and the width Y-EGM of the gaming machines 102 in some implementations of a gaming machine insulation in accordance with aspects of the invention. FIG. 11 shows the three gaming machines 102 aligned side-by-side each with a candle support 112 located on the centerline C of the respective gaming machine. An overhead display including an overhead display mounting system 100 is included in the example installation. The overhead display mounting system includes two base supports 104 supported by the two outer gaming machines 102 via the gaming machine candle base 112. Each base support 104 includes a first support part 118 of a base support bracket and a second support part 120 of the base support bracket. The two first support parts 118 support lateral first lateral support element 108 while the two second support parts 120 support second lateral support element 109. Support points for the video display modules 150 are shown by Xs in FIG. 11 and the support points may be provided by a display module hanger bracket such as bracket 130 described above in connection with FIGS. 5 through 8.

As shown in FIG. 11, the installed width Y-EGM of each gaming machine 102 is slightly greater than the actual width dimension of the gaming machine to account for variations in the surface on which the gaming machines are mounted and manufacturing tolerances for the gaming machine cabinets themselves. Thus FIG. 11 shows a small gap between sides of adjacent gaming machines 102. The installed width Y-EGM of each gaming machine 102 in the illustrated example of FIG. 11 is equal to the width Y-DM of each video display module 150. Thus the edges of adjacent video display modules 150 essentially abut one another and leave no gap. In this way the combined video display modules 150 form an overall display area (Y-DM x 3 wide in this example) above gaming machines 102 for seamlessly displaying graphics associated with the games or otherwise across the entire display area.

Power and data cables for video display modules 150 may be routed in any suitable fashion for an overhead display mounting system in accordance with aspects of the invention. In some implementations, a power connector along with a data cable jack (such as an RJ-45 jack) may be mounted on the base support such as base support 104 facing forwardly in position to connect to power and data cables, respectively, for the video display module positioned in front of the base support. Depending upon how far forward the video display module is positioned relative to the base support, the power connector and data cable jack may located on an extension from the front side of the base support. Power and data paths may then pass from the video display module to the next adjacent video display module either behind the housing for the video display module or through openings in the lateral edge of the video display module.

Figure 12:
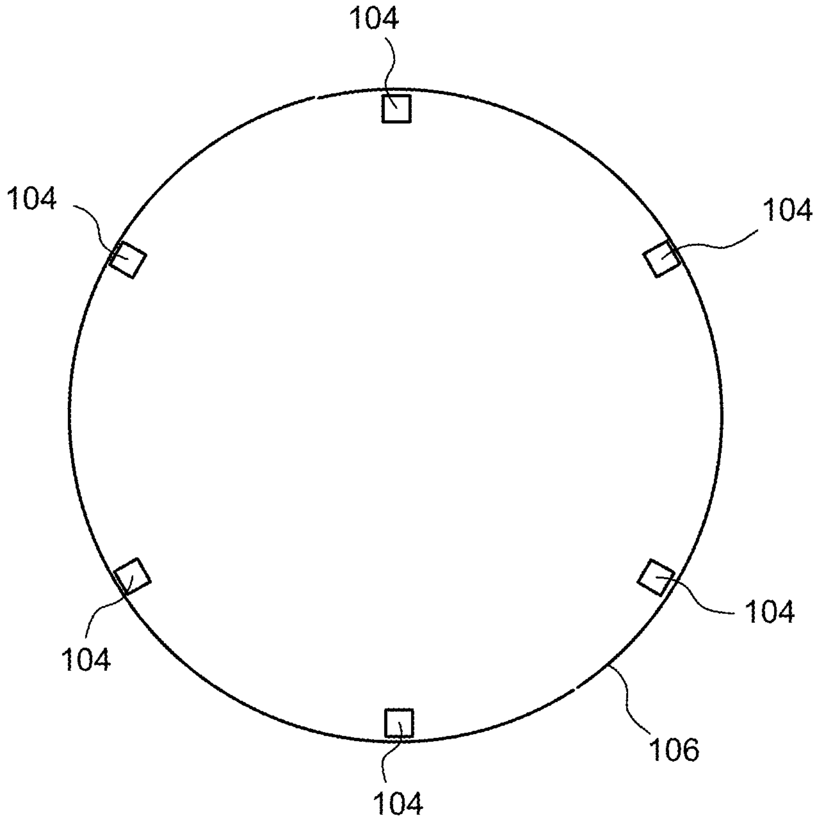
FIG. 12 is a schematic drawing showing a curved lateral support system in contrast to the linear lateral support system shown for example in FIG. 11.

Implementations according to the various aspects of the present invention may include numerous variations from the arrangement shown as examples in FIGS. 1 through 11. For example, although FIGS. 1, 9, and 10 all show installations for a group of three side-by-side gaming machines, other installations may include more than three gaming machines or two gaming machines. For longer installations including more than three gaming machines, it may be necessary to include one or more additional base supports (104 in FIG. 1) to support the weight of the lateral support system and video display modules. The overhead display mounting system also may be applied to banks of gaming machines that are not in a straight line. FIG. 12 for example shows a circular arrangement for a bank of gaming machines. The circular arrangement includes six base supports 104 that may each be associated with a respective gaming machine or may be freestanding. The six base supports 104 support a lateral support system 106 made up of curved lateral support elements, in this case curved to form a circular shape. Yet other arrangements may include polygonal shaped arrangements in which adjacent base supports 104 support linear lateral support elements that form the sides of the polygonal shape.

Other variations involve the video display modules that may be used to produce the desired overhead display. Although the figures show a video display module 150 that houses a single display segment, other implementations may use video display modules having a housing on which multiple video display segments may be mounted. In these cases a video display module housing may be connected to suitable module hanger brackets (such as brackets 130*a* and 130*b* in FIG. 5) first and then the video display module housing may be positioned on the lateral support elements as shown in FIGS. 9 and 10 and connected for power and data. Video display segments may then be installed on the video display module housing in accordance with the video display module design. Also, regardless of the nature of the video display modules used, each video display module housing may have a connector and/or an alignment feature adapted to cooperate with a connector and/or alignment feature on an adjacent video display module to connect the two video display modules together to form the desired seamless display area. Further, although FIGS. 9 and 10 show video display modules 150 having a planar display surface, an overhead display in accordance with aspects of the invention may include concave or convex display surfaces.

Figure 13:
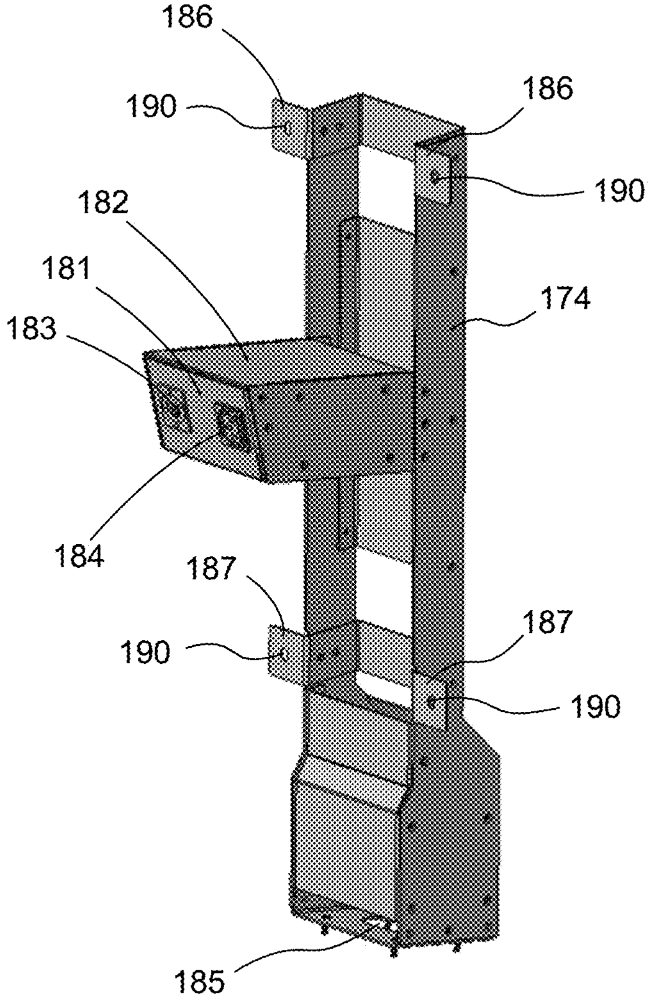
FIG. 13 is a perspective view of an alternate base support for routing power and data to a display module.
Figure 14:
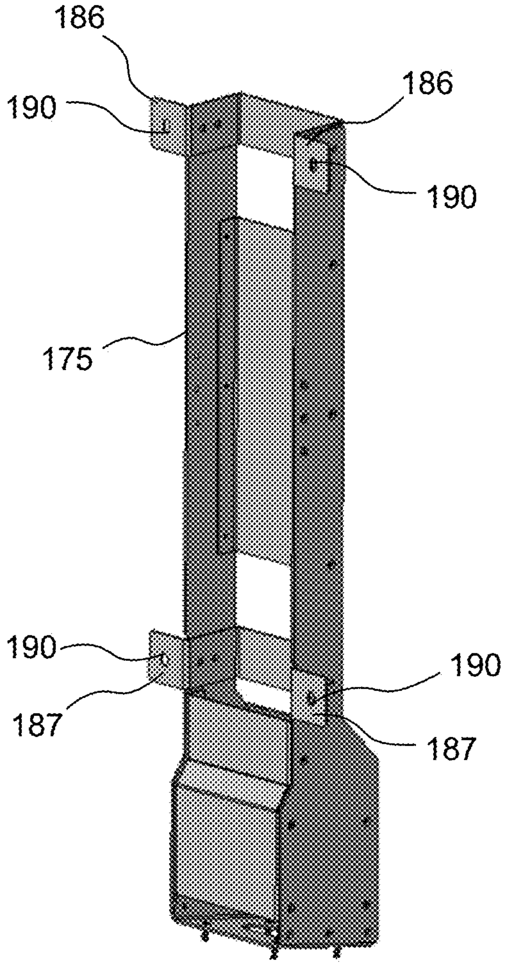
FIG. 14 is a perspective view of the alternate base support shown in FIG. 13, but without the power and data routing arrangement.

FIGS. 13 through 20 show various components of a second embodiment of an overhead video display mounting system in accordance with aspects of the present invention. FIG. 13 shows a first base support 174 according to this second embodiment while FIG. 14 shows a second base support 175. Similarly to base supports 104 shown in FIGS. 1-3, first base support 174 and second base support 175 are adapted to connect to a candle base of a gaming machine. As shown in FIG. 13, first base support 174 includes a forwardly projecting data/power housing 182. The forward-facing surface 181 of housing 182 includes a female data connector 183 and a female power connector 184. Although the cabling is not shown in FIG. 13, it will be appreciated that power and data cabling extends from the connectors 184 and 183, respectively, through housing 182 and through base support 174. This cabling may extend downwardly through opening 185 and into a gaming machine cabinet on which the base support 174 may be mounted.

As compared to base support 104 described above, each of the base supports 174 and 175 includes a somewhat different support bracket arrangement for connecting the lateral support elements of the video display mounting system in this alternate embodiment. As shown in FIGS. 13 and 14 the base support brackets in this embodiment include a first base support bracket 186 at the top of the respective base support 174 and 175, and a second base support bracket 187 lower down on the respective base support 174 and 175. Unlike the base support brackets 116*a* and 116*b* shown in FIG. 3, the base support bracket arrangement shown in FIGS. 13 and 14 does not include a protruding part for supporting the respective lateral support element from below. Rather, each base bracket 186 and 187 includes a fastener or clamp opening 190 through which a suitable fastening element or clamping element may extend to a cooperating element or groove on the respective lateral support element.

Figure 15:
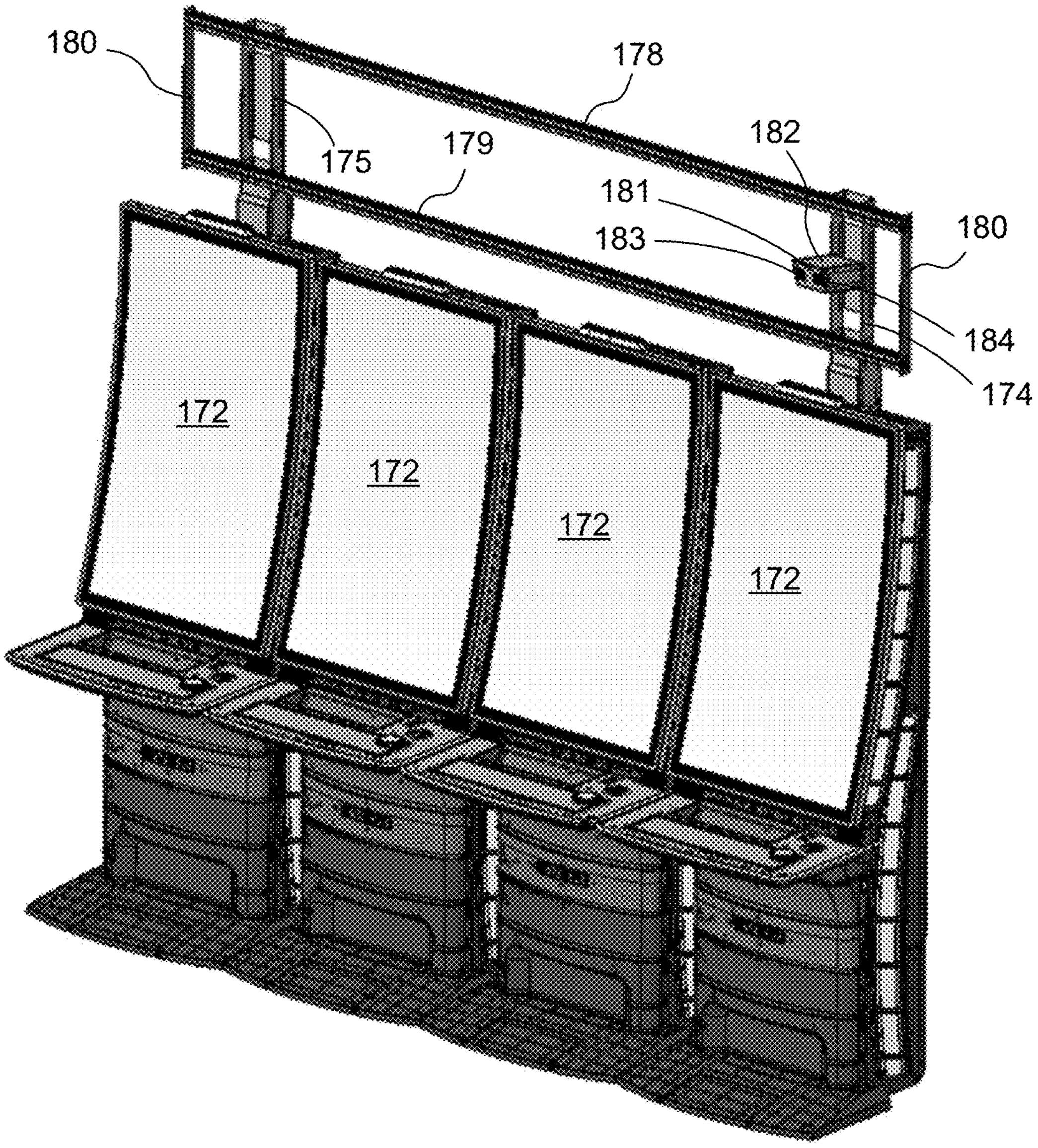
FIG. 15 is a view in perspective of a bank of four gaming machines with portions of a display mounting system according to a second embodiment.

FIG. 15 shows a bank of four gaming machines 172 on which a first base support 174 and a second base support 175 are mounted. The two base supports 174 and 175 are shown with the first lateral support element 178 and second lateral support element 179 connected so as to extend essentially horizontally. The embodiment shown in FIG. 15 also includes an end plate 180 connected at each end of the two lateral support elements 178 and 179.

Figure 16:
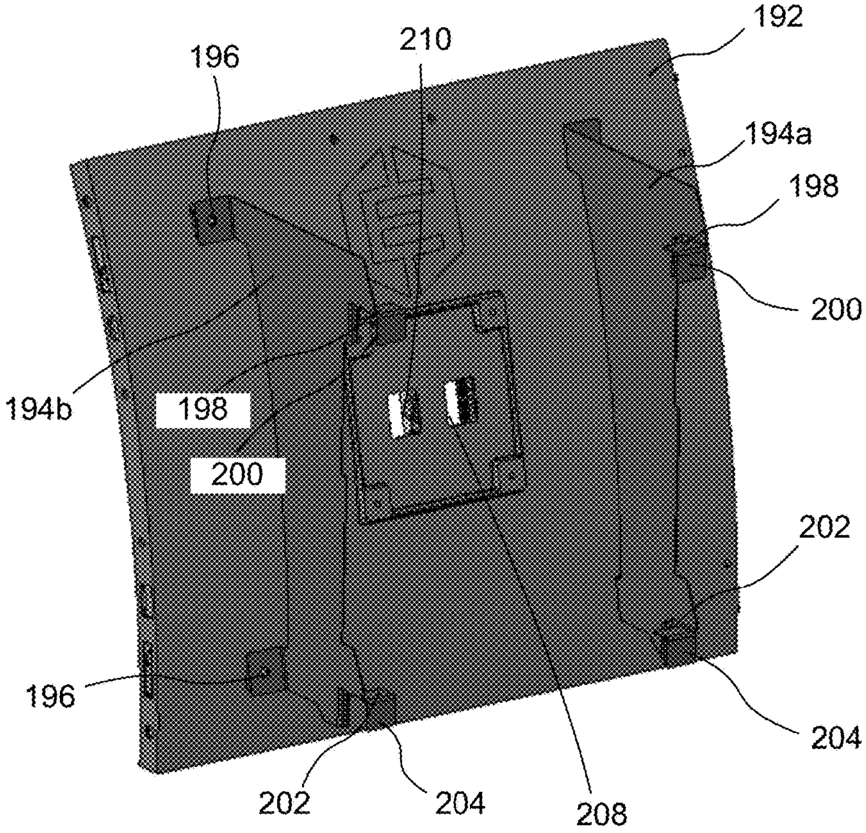
FIG. 16 is a rear perspective view of a video display module housing with display module hanger brackets connected thereto.
Figure 17:
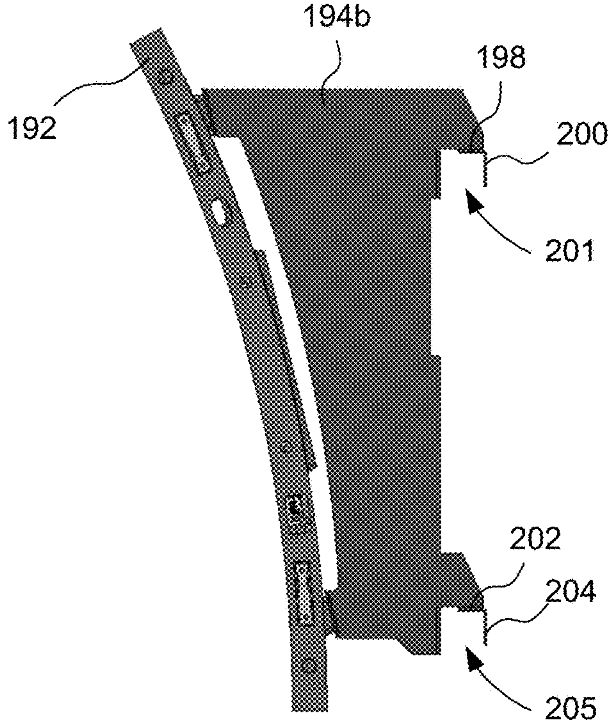
FIG. 17 is a side view of the video display module housing and display module hanger brackets shown in FIG. 16.

FIGS. 16 and 17 show a video display module housing 192 connected to display module hanger brackets 194*a* and 194*b*. The two hanger brackets 194*a* and 194*b* are connected via suitable fasteners (not shown) that extend through fastener openings 196 to suitable threaded openings (not shown) formed in the video module housing 192. FIG. 16 shows that video display module housing 192 includes a data access opening 208 and a power access opening 210 which will be described further below in connection with FIGS. 19 and 20. Each hanger bracket 194*a* and 194*b* includes a hanger part 198 associated with a retention element 200 to form and L-shaped component. Each hanger bracket 194*a* and 194*b* also includes a stabilizing part 202 and stabilizing part retention element 204 which also form an L-shaped component. As shown particularly in the side view of FIG. 17, hanger part 198 and retention element 200 define a receiving space 201 with the remainder of the bracket. This receiving space 201 is sized to receive the first lateral support element 178 with close tolerance. Similarly, the stabilizing part 202 and stabilizing part retention element 204 define a receiving space 205 that is sized to receive second lateral support element 179 with close tolerance.

Figure 18:
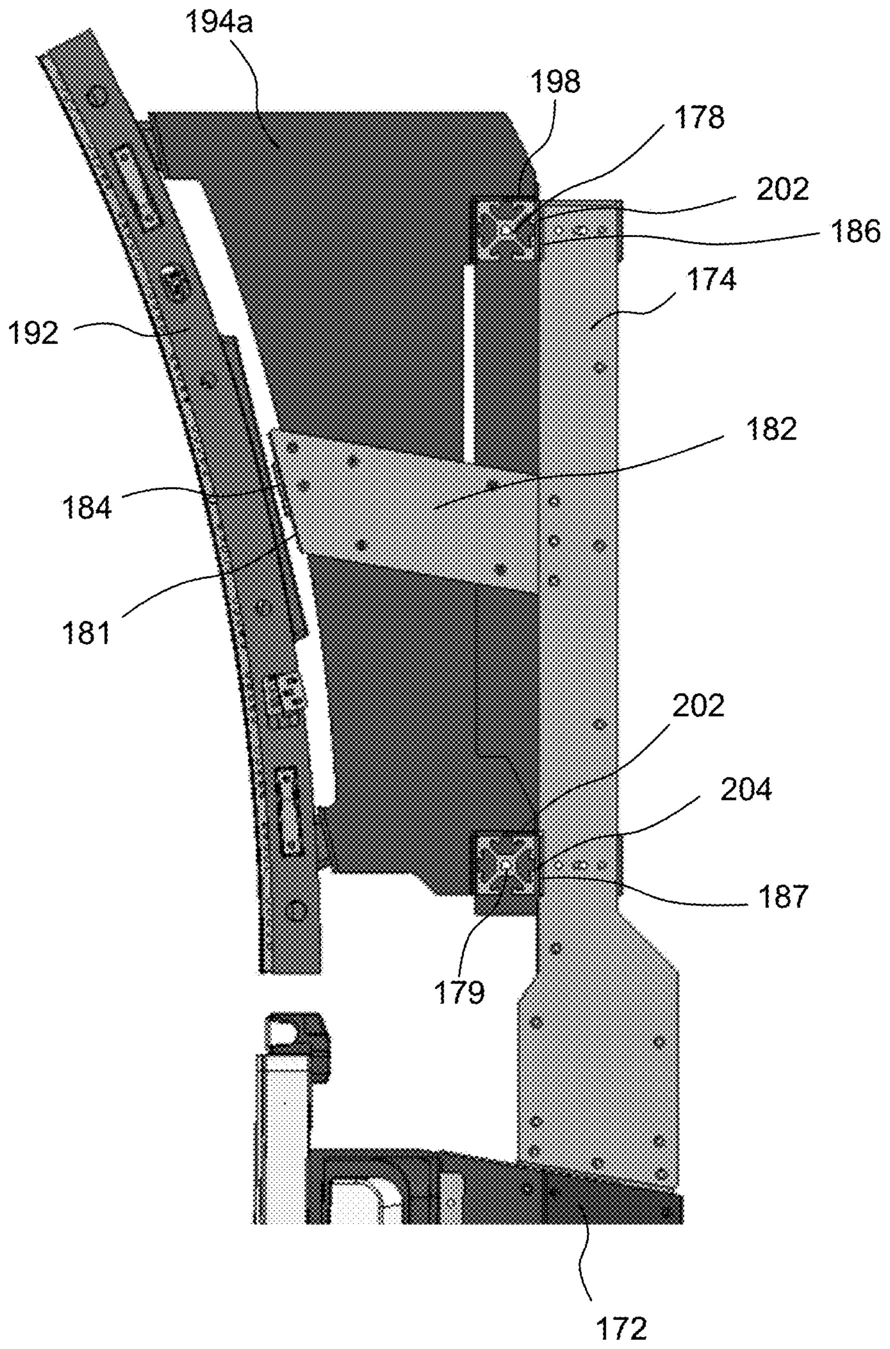
FIG. 18 is a side view similar to FIG. 17 but with the video display module housing in an operating position on the mounting system and with the near display module hanger bracket removed.

FIG. 18 shows the video display module housing 192 with just mounting hanger bracket 194*a* in an operating position on the lateral support elements 178 and 179. In this operating position the projecting part of data and power housing 182 positions data connector 183 and power connector 184 to align with access openings 208 and 210 respectively at the back of video display module housing 192. With this alignment, data and power cables may be connected to the connectors 184 and 183, respectively, to provide power and control data to housing 192, and more particularly to the control circuitry and video display panels mounted on housing 192.

Figure 19:
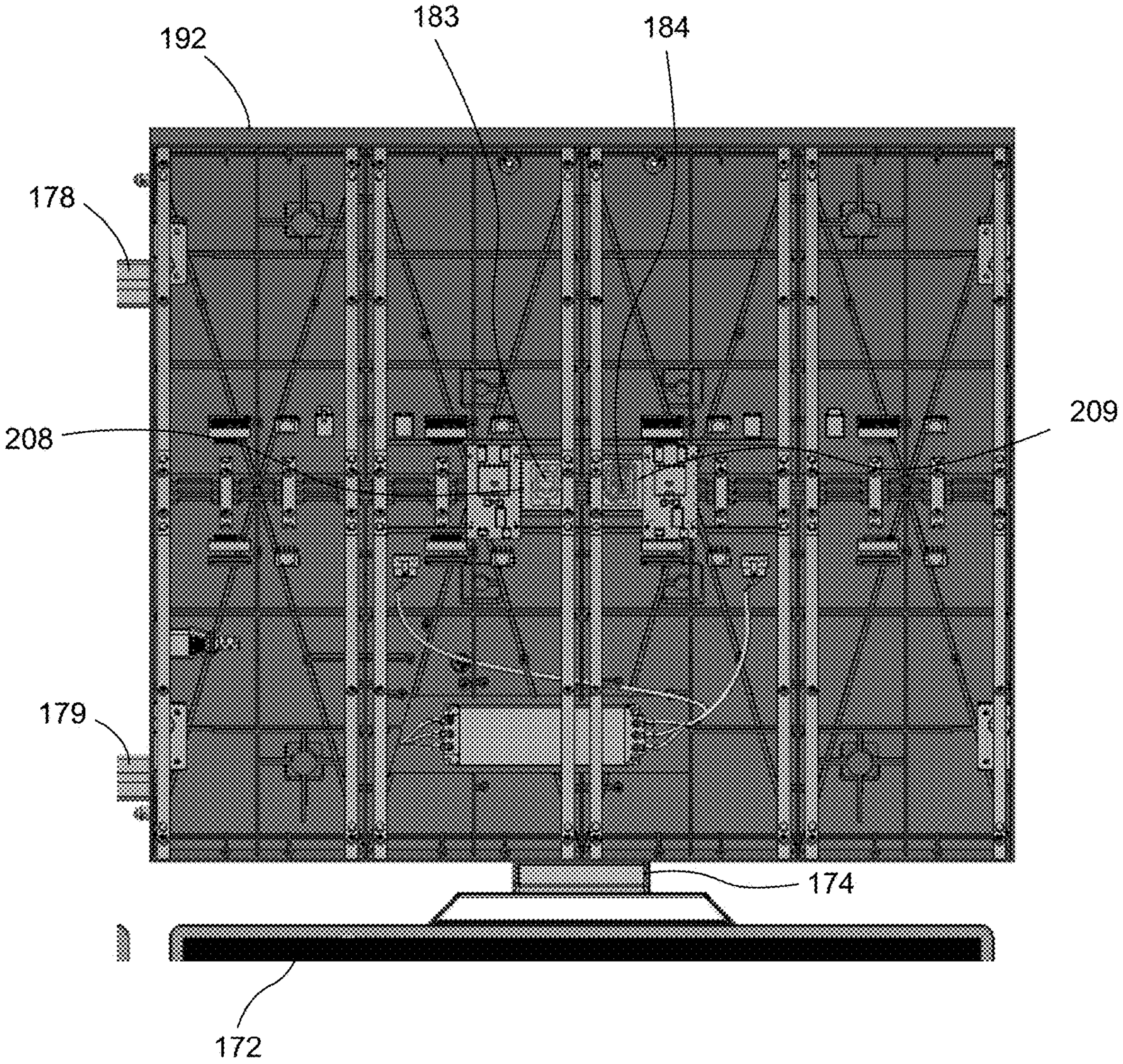
FIG. 19 is a front view of the video display module housing in the operating position above a gaming machine.
Figure 20:
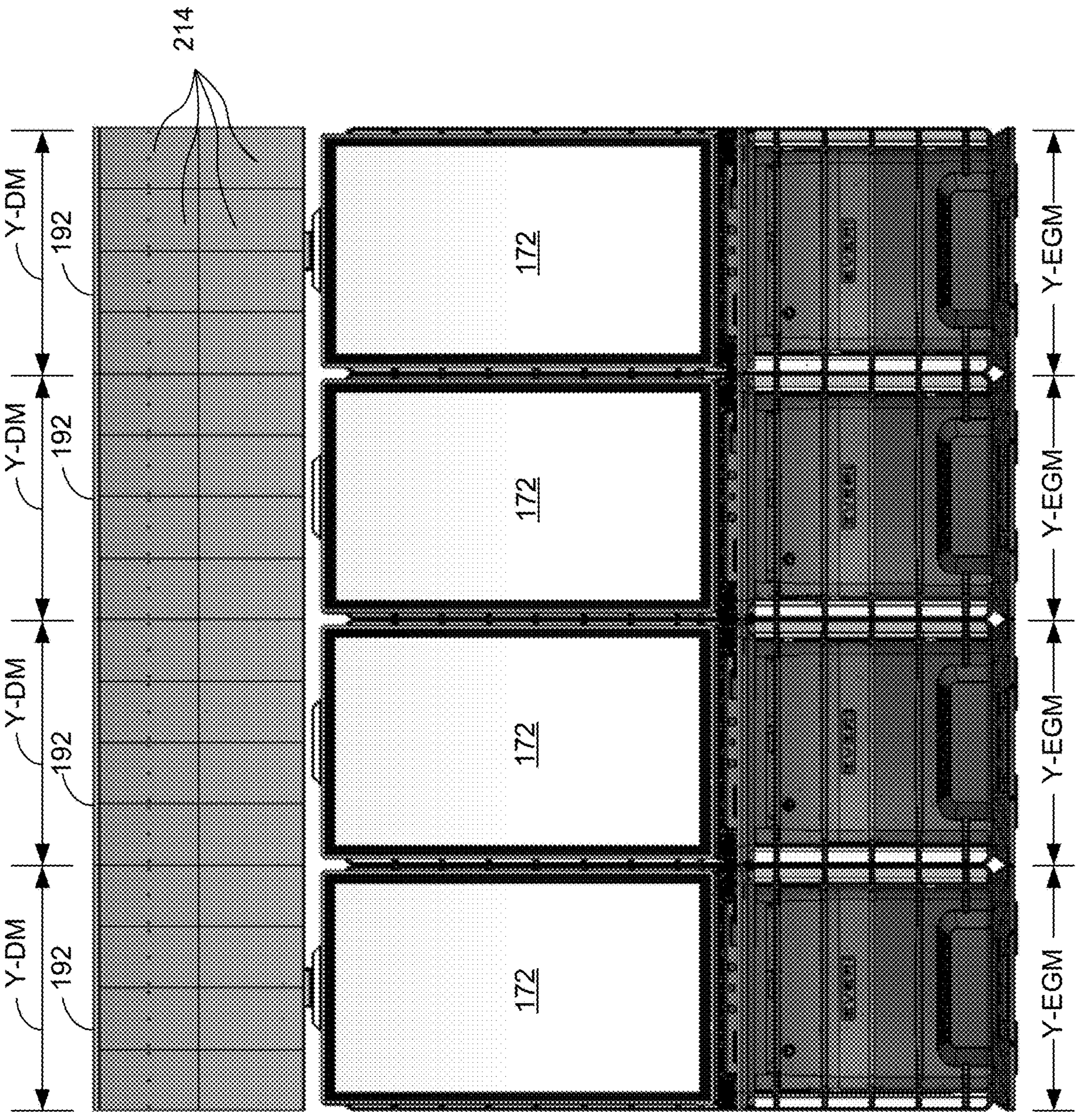
FIG. 20 is a front view of the bank of gaming machines shown in FIG. 15, but with the overhead video display as fully installed on a mounting system according to the second embodiment.

Starting from the arrangement shown in FIG. 15, a first video display module housing 192 with brackets 194*a* and 194*b* connected as shown in FIG. 16 may be mounted on the lateral support elements 178 and 179 as indicated in FIGS. 18 and 19. The remaining video display module housings 192 for the system may be similarly positioned on lateral supports 178 and 179 to fill out the overhead display area. As is known in the art, video display module housings 192 may include alignment features on their lateral edges to ensure alignment between adjacent housings. Locking elements may also be included at the lateral edges of the housings 192 to lock adjacent housings together in the aligned position. With the video module housings 192 thus supported on lateral elements 178 and 179, power and data connection may be provided through access openings 208 and 210 in the module housing 192 aligned with base support 174. Power and data can be extended to the other video module housings for the installation through openings in the lateral edges of the housings 192 as is known in the art. Once the data in power connections are in place, the video display panels adapted for use with the module housings 192 may be installed on each module housing 192 accordance in accordance with the module design. Each example module housing 192 is adapted to receive two rows of four elongated LED display panel segments 214 shown in FIG. 20 to complete the installation. In this example installation in accordance with the invention the installed width Y-DM of each of the four video display modules is essentially equal to the installed width Y-EGM of each of the four gaming machines 172.

Figure 21:
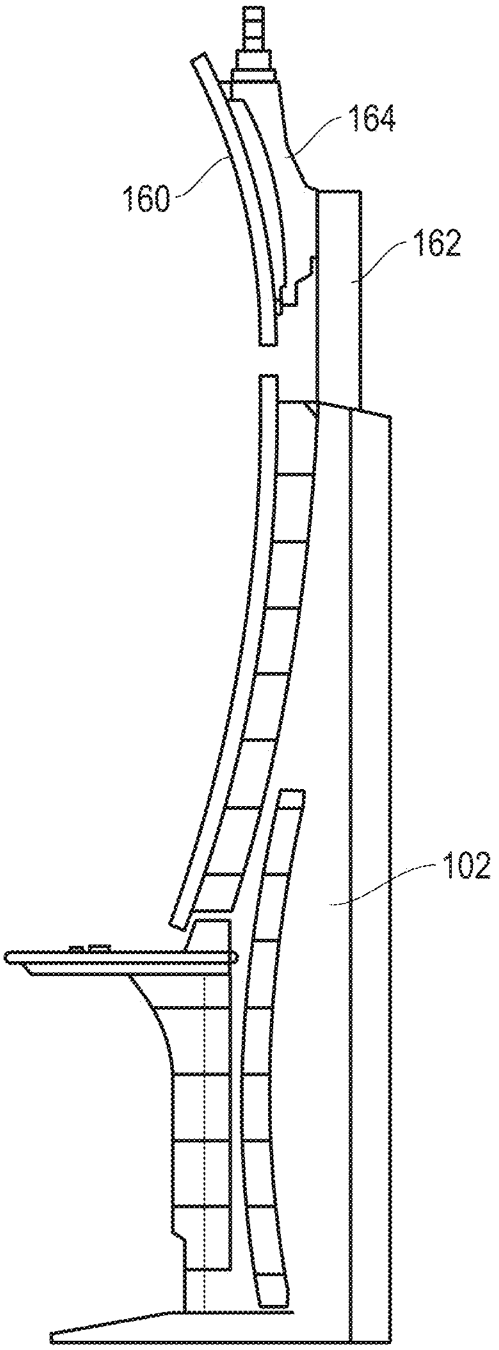
FIG. 21 is a side view of a gaming machine and upper display panel in accordance with an additional aspect of the present invention.
Figure 22:
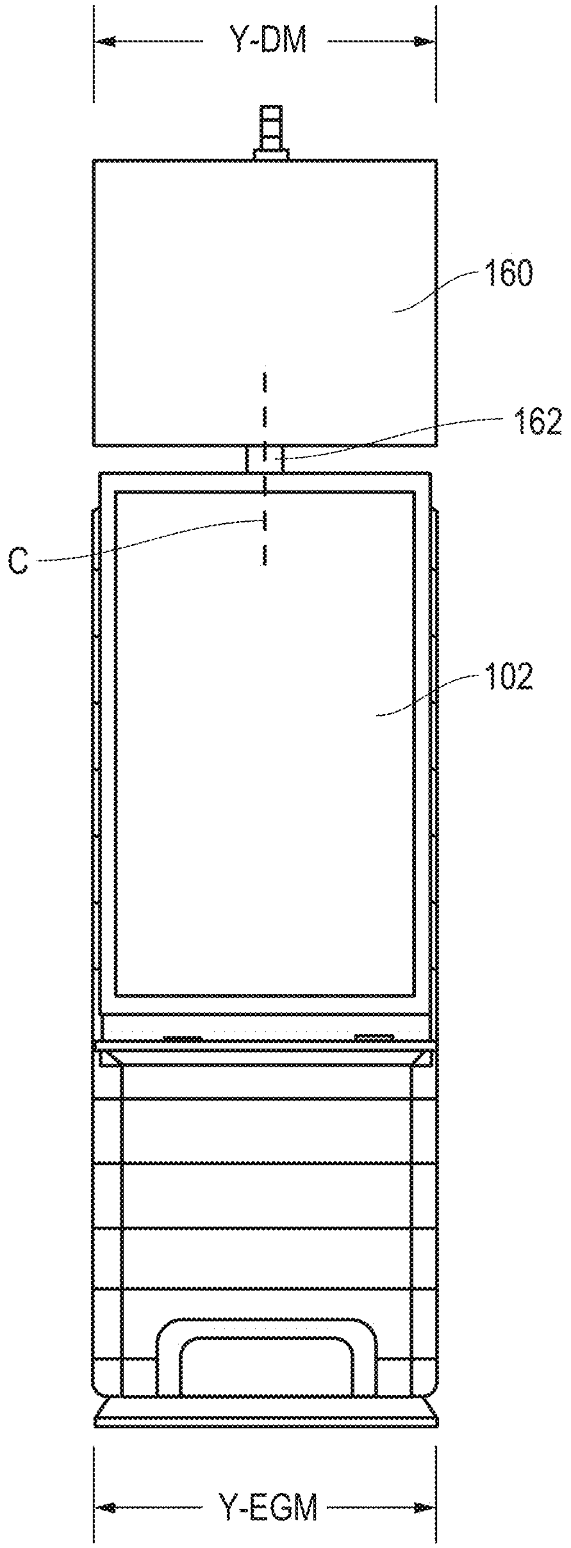
FIG. 22 is a front view of the gaming machine and upper display panel shown in FIG. 21.

FIGS. 21 and 22 show an alternative arrangement for providing an overhead display for a bank of side-by-side gaming machines. In this alternate arrangement, each gaming machine 102 supports a respective video display module 160 mounted on a base support 162 aligned with the gaming machine centerline C. A module hanger bracket 164 shown in the side view of FIG. 21 connects the respective video display module 160 to the respective base support 162. This is in contrast to the arrangement shown in FIGS. 9 and 10 for example where the video display modules of the overhead display are mounted on lateral support elements 108 and 109. As shown in FIG. 22, the width Y-DM of video display module 160 is essentially equal to the installed width Y-EGM of gaming machine 102. This allows to gaming machines 102 each supporting a separate video display module 160 to be placed side-by-side with the edges of adjacent video display modules 160 abutting each other to form a substantially continuous overhead display area over the installed set of gaming machines.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A display mounting system for positioning a number of display modules above a set of gaming machines, the display mounting system including:

(a) first and second base supports adapted to be placed in a laterally spaced apart supporting configuration;

(b) a lateral support system including a first lateral support element and second lateral support element, the lateral support system adapted to be placed in a display module receiving configuration in which the lateral support system is connected to the first and second base supports in the supporting configuration, wherein when the lateral support system is in the display module receiving configuration the first and second lateral support elements together provide a number of display receiving locations along a length of the lateral support system; and (c) at least two display module hanger brackets each display module hanger bracket having a respective hanger structure and a respective stabilizing structure spaced apart from the respective hanger structure so that when a respective one of the display module hanger brackets is placed in an installed position on the lateral support system (i) the hanger structure of that respective display module hanger bracket is supported along a height axis by the first lateral support element and (ii) the stabilizing structure of that respective display module hanger bracket cooperates with the second lateral support element to position that respective stabilizing structure relative to the second lateral support element, wherein the first and second base supports each include a respective candle base connector structure configured to connect to a candle base of a respective gaming machine to place the first and second base supports in the laterally spaced apart supporting configuration.

2. The display mounting system of claim 1 wherein:

(a) an electronics connector housing is mounted on the first base support, the electronics connector housing traversing a support element plane defined by the first lateral support element and the second lateral support element in the display module receiving configuration;

(b) the electronics connector housing includes a connector housing surface located on a first side of the support element plane while the first base support is located on an opposite side of the support element plane when the first lateral support element and the second lateral support element are in the display module receiving configuration; and (c) at least one electrical connector is mounted at the connector housing surface.

3. The display mounting system of claim 1 wherein:

(a) the first base support includes a first base support bracket having (i) a first base bracket part extending transverse to a longitudinal axis of the first base support and configured to receive a segment of the first lateral support element and having (ii) a second base bracket part extending transverse to a longitudinal axis of the first base support and configured to receive a segment of the second lateral support element; and (b) the second base support includes a second base support bracket having (i) a first base bracket part extending transverse to a longitudinal axis of the second base support and configured to receive an additional segment of the first lateral support element and having (ii) a second base bracket part extending transverse to a longitudinal axis of the second base support and configured to receive an additional segment of the second lateral support element.

4. The display mounting system of claim 3 wherein one of the first lateral support element and second lateral support element are spaced apart from an upright portion of the first base support and an upright portion of the second base support when the lateral support system is in the display module receiving configuration.

5. The display mounting system of claim 1 wherein at least one of the first lateral support element and the second lateral support element comprises an elongated rail.

6. The display mounting system of claim 1 wherein a first one of the display module hanger brackets includes a display module connector structure adapted to connect the first display module hanger bracket to a display module.

7. A display mounting system for positioning a number of display modules above a set of gaming machines, the display mounting system including:

(a) first and second base supports adapted to be placed in a laterally spaced apart supporting configuration;

(b) a lateral support system including a first lateral support element and second lateral support element, the lateral support system adapted to be placed in a display module receiving configuration in which the lateral support system is connected to the first and second base supports in the supporting configuration, wherein when the lateral support system is in the display module receiving configuration the first and second lateral support elements together provide a number of display receiving locations along a length of the lateral support system; and (c) at least two display module hanger brackets each display module hanger bracket having a respective hanger structure and a respective stabilizing structure spaced apart from the respective hanger structure so that when a respective one of the display module hanger brackets is placed in an installed position on the lateral support system (i) the hanger structure of that respective display module hanger bracket is supported along a height axis by the first lateral support element and (ii) the stabilizing structure of that respective display module hanger bracket cooperates with the second lateral support element to position that respective stabilizing structure relative to the second lateral support element, wherein the respective mounting structure of a first one of the display module hanger brackets includes a retention element that abuts a rearwardly facing surface of the first lateral support element when the first display module hanger bracket is placed in the installed position on the lateral support system.

8. The display mounting system of claim 7 wherein the respective hanger structure of the first one of the display module hanger brackets includes a spacer element that abuts a forwardly facing surface of the first lateral support element when the first display module hanger bracket is placed in the installed position on the lateral support system.

9. A display mounting system for positioning a number of display modules above a set of gaming machines, the display mounting system including:

(a) first and second base supports adapted to be placed in a laterally spaced apart supporting configuration;

(b) a lateral support system including a first lateral support element and second lateral support element, the lateral support system adapted to be placed in a display module receiving configuration in which the lateral support system is connected to the first and second base supports in the supporting configuration, wherein when the lateral support system is in the display module receiving configuration the first and second lateral support elements together provide a number of display receiving locations along a length of the lateral support system; and (c) at least two display module hanger brackets each display module hanger bracket having a respective hanger structure and a respective stabilizing structure spaced apart from the respective hanger structure so that when a respective one of the display module hanger brackets is placed in an installed position on the lateral support system (i) the hanger structure of that respective display module hanger bracket is supported along a height axis by the first lateral support element and (ii) the stabilizing structure of that respective display module hanger bracket cooperates with the second lateral support element to position that respective stabilizing structure relative to the second lateral support element, wherein the respective stabilizing structure of a first one of the display module hanger brackets includes a retention element that abuts a rearwardly facing surface of the second lateral support element when the first display module hanger bracket is placed in the installed position on the lateral support system.

10. The display mounting system of claim 9 wherein the respective stabilizing structure of the first one of the display module hanger brackets includes a spacer element that abuts a forwardly facing surface of the second lateral support element when the first display module hanger bracket is placed in the installed position on the lateral support system.

* * * * *